United States Patent Office 2,935,349
Patented May 3, 1960

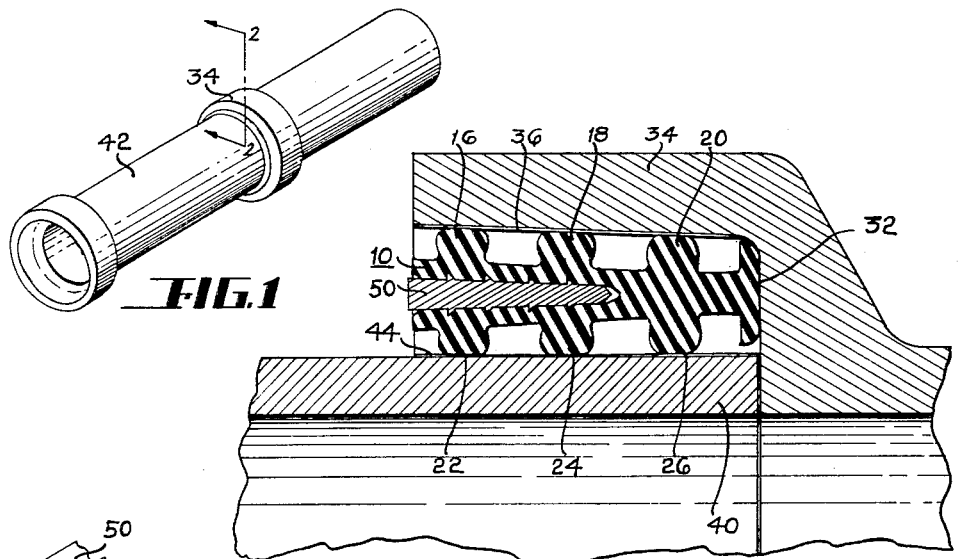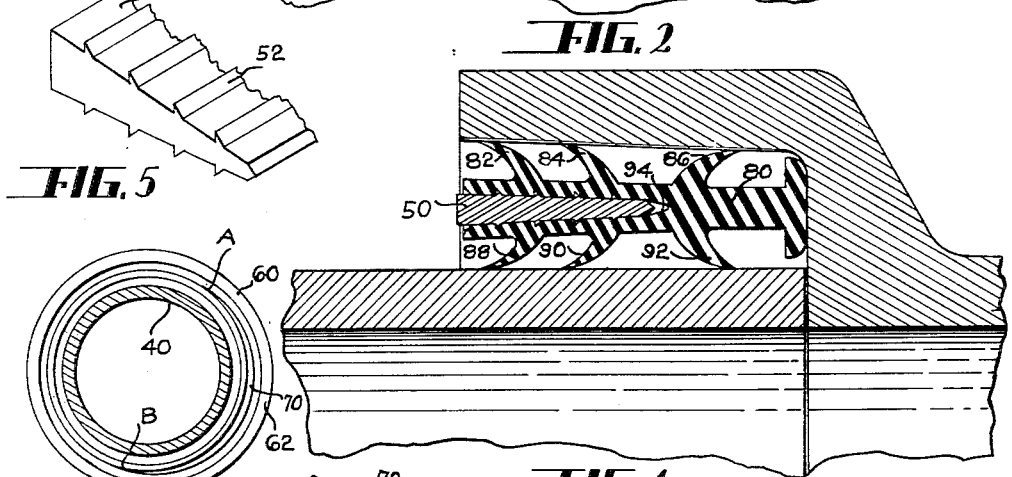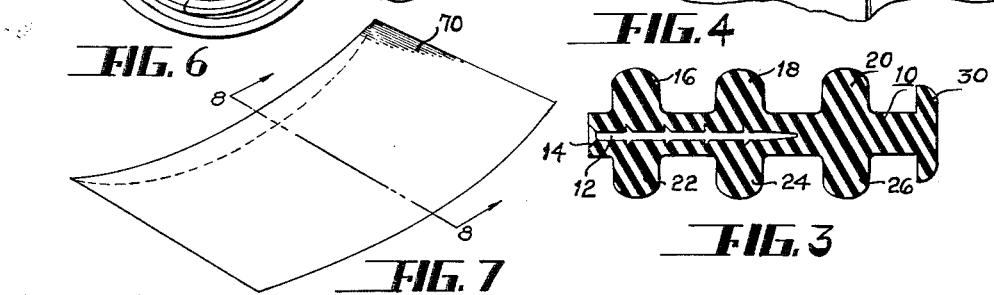

2,935,349

SEAL

Kenneth C. Burch, Dayton, Ohio

Application October 7, 1957, Serial No. 688,626

5 Claims. (Cl. 288—7)

This invention relates to a sealing unit for vitreous tile drainage pipes or sewer pipes of the type wherein the spigot projects into an end bell although the invention is not so limited, in that it can be used as a sealing unit for other types of joints.

This invention is an improvement upon the seal disclosed in my application Serial No. 560,211, filed January 19, 1956, now abandoned.

An object of this invention is to provide a sealing unit wherein the sealing unit may be wedged into contact with the spigot and the end bell.

A further object of this invention is to provide a sealing unit wherein compensating means may be utilized to compensate for the out-of-round of the end bell or the out-of-round of the spigot, so that if the end bell or the spigot is not cylindrical or frustum-conical, the compensating means is used to absorb the variations of the out-of-round of the pipe.

Other objects and advantages reside in the construction of parts, the combination thereof, the method of manufacture and the mode of operation, as will become more apparent from the following description.

Referring to the drawings, Figure 1 is a perspective view of two pipes that have been connected together by the sealing unit disclosed herein.

Figure 2 discloses a cross sectional view taken substantially on the line 2—2 of Figure 1, disclosing a preferred embodiment of the sealing unit.

Figure 3 is a cross sectional view of the sealing unit before the wedge has been inserted.

Figure 4 is a cross sectional view similar to Figure 2, disclosing a modification.

Figure 5 is an end view of a strip of material used as a wedge, only a portion of the strip of material being shown.

Figure 6 is a transverse cross sectional view, disclosing an out-of-round end bell and compensating means inserted so as to compensate for the out-of-round of the end bell.

Figure 7 is a perspective view of a wedge sector that may be used to compensate for out-of-round variations of the pipe.

Figure 8 is a cross sectional view, taken substantially on the line 8—8 of Figure 7.

Referring to the drawings in greater detail, the ring seal of this invention, as illustrated in Figures 2 and 3, is constructed from a ribbon 10 made of an elastomer or a resilient flexible plastic having a suitable cross sectional shape. The ribbon is extruded or formed by compression molding or by any other suitable method. In making the sealing ring, the ribbon 10 is first cut to a predetermined length, after which the cut ends are joined together to form a ring by flexing, solvent bonding or using a suitable cementing material or uniting the ends in any other suitable manner.

In Figure 3 a cross sectional end view of member 10 has been shown before it is inserted in the joint and before it has been expanded. The main body or the wall portion of member 10 is provided with an inwardly directed slot 12 that extends more than half way through the width of the ring. The outer end of this slot may have bevelled margins 14, as clearly shown in Figure 3.

Three ribs 16, 18 and 20 project from one side of the main body or wall portion of member 10 and ribs 22, 24 and 26 are mounted opposite the ribs 16, 18 and 20 respectively. One end of the main body or wall portion may be provided with oppositely disposed flanges 30 forming an abutment surface adapted to engage the shoulder 32 of the end bell 34.

A suitable mastic material 36 is placed on the inside surface of the end bell and is used in cementing the ribs 16, 18 and 20 within the end bell. The ring is preferably inserted into the end bell at the factory, so as to be ready for installation. When the time comes for assembling the pipes, the spigot end 40 of the pipe 42 is coated with a mastic material 44 and then inserted into the end bell. A considerable force is required to insert the spigot 40 into the end bell 34. A tool like that disclosed in Guy C. Franklin's application for United States Letters Patent Serial No. 582,179, filed May 2, 1956, now abandoned for Pipe Jack, may be used for forcing the spigot into the end bell.

After this spigot has been inserted, a strip of wedging material 50, provided with small saw-tooth-like ribs 52, is cut to the proper length, so as to have a length corresponding substantially to the circumferential length of the slot 12. This wedge 50 is driven into the slot 12, so as to be positioned in the slot, as clearly shown in Figure 2. This wedge 50 forces the ribs 16 and 18, 22 and 24 against the end bell 34 and the spigot 40. As a matter of fact, the ribs are preferably so proportioned that the ribs are deformed, as clearly shown in Figure 2, so as to firmly press against the end bell and against the spigot. It is to be noted that the end bell tapers. By using the wedge 50, it is possible to use ribs of substantially the same dimensions throughout the entire length of member 10. Then by utilizing the wedge, the ribs 16 and 22 are deformed substantially the same as the ribs 20 and 26. The portion of the seal in the vicinity of the ribs 18 and 24 has also been spread, but not as wide as the spread of the ribs 16 and 22. This is accomplished by means of the wedge. The small saw-tooth-like ribs 52 of the wedge 50 hold the wedge in position and offer resistance to the removal of the wedge. This wedge may be made out of plastic material or it may consist of extruded metal, as for example, extruded aluminum, that may be easily cut and curved to the desired circular formation.

In some cases, the end bell or the spigot may be out-of-round. In Figure 6 an end bell 60 has been shown that has been deformed at 62, so as to provide a gap between the end bell and the spigot that varies in width from the point A to the point B. In such an event, an auxiliary tapered wedge 70 may be used. As clearly illustrated in Figures 7 and 8, this auxiliary wedge 70 is arcuate in shape and tapers both circumferentially and axially. This wedge 70 is driven between the wedge 50 and the outer portion of the elastomeric ring 10, so as to fill up the space of the out-of-round area on the end bell 60. In the event the spigot has a flattened area, member 70 would then be driven between the inner portion of the ring and the wedge 50. The wedge 70 may be selected from a plurality of wedges of various lengths and thicknesses, depending upon the size of the out-of-round portion of the bell or the spigot.

In Figure 4 a modification has been shown, wherein the main body 80 is provided with crescent-shaped ribs 82, 84 and 86, diametrically arranged with the crescent-shaped ribs 88, 90 and 92 respectively. In this modification a slot 94, similar to the slot 12, has been made in one margin of the main body of the sealing ring. A wedge 50, identical to that described above, is used to spread the ribs 82, 84, 88 and 90 apart and into intimate contact with the end bell and the spigot.

By utilizing crescent-shaped ribs, less elastomeric material is required, the ribs 82 and 84 resisting forces from the outside and the ribs 86 and 92 resisting most effectively pressures generated within the pipes. It can readily be seen that a differential in pressure exerts a force, more firmly pressing the feathery edges of the crescent-shaped ribs into intimate contact with the end bell and against the spigot.

The materials used in the sealing ring and in the wedge, particularly in the sealing ring, are such that most chemicals will have very little, if any, deleterious effect thereon. Furthermore, the material is such that it will not deteriorate, even though it may be buried in the ground, subjected to moisture, chemicals, et cetera.

This seal is effective in sealing joints, is easily installed, is long lived, dependable and, at the same time, inexpensive, in that a joint may be sealed in a few minutes, whereas the old method of packing oakum and lead or some other sealing compound into the joint is a slow, tedious operation.

Although the sealing unit has been described in association with an end bell and a spigot joint, it may be used as a sealing gasket where a cylindrical cavity is to be sealed.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A sealing ring for insertion into the annular cavity of a bell and spigot pipe joint, said ring including a plurality of pairs of radially aligned resilient annular rib members for compressively engaging the concentric bell and spigot surfaces of said joint, a centrally disposed axially extending annular wall portion for supporting the pairs of rib members in fixed spaced relationship, said wall portion having inwardly and outwardly directed resilient flange portions at one end thereof to provide a base portion for abutment with the shoulder of the bell portion of said joint, said wall portion having a slot projecting inwardly from the margin opposite the wall portion having inwardly and outwardly projecting flange portions, and a wedge member seated in said slot.

2. A sealing ring according to claim 1, wherein the rib members are crescent-shaped and arch away from the base portion of the sealing ring.

3. A sealing ring according to claim 1, wherein the rib members are crescent-shaped, one pair of rib members arching in the direction of the base portion of the sealing ring and another pair of crescent-shaped rib members arching away from the base portion of the sealing ring.

4. A sealing unit for insertion into the annular cavity formed between bell and spigot pipe members one of which has an out-of-round condition, said unit including a plurality of pairs of radially aligned resilient rib members for compressively engaging the opposing wall surfaces of said cavity, an annular body portion supporting said rib members in fixed spaced relation, said body portion having an annular slot projecting inwardly from one margin thereof, and an arcuate wedge member tapering both circumferentially and axially seated in said slot, said wedge member being selected from a plurality of wedge members of various sizes to compensate for said out-of-round condition.

5. A sealing unit for insertion into the annular cavity formed between bell and spigot pipe members one of which has an out-of-round condition, said unit including a plurality of pairs of radially aligned resilient rib members for compressively engaging the opposing wall surfaces of said cavity, an annular body portion supporting said rib members in fixed spaced relation, said body portion having an annular slot projecting inwardly from one margin thereof, an annular wedge member seated in said slot, and a second arcuate wedge member tapering both circumferentially and axially seated in said slot adjacent said annular wedge member, said second wedge member being selected from a plurality of wedge members of various sizes to compensate for said out-of-round condition.

References Cited in the file of this patent

UNITED STATES PATENTS

| | | |
|---|---|---|
| 1,246,089 | Greenoe | Nov. 13, 1917 |
| 2,226,067 | Morgan | Dec. 24, 1940 |
| 2,396,491 | Chamberlain | Mar. 12, 1946 |
| 2,615,741 | Nathan | Oct. 28, 1952 |